3,507,921
3-SUBSTITUTED 5-NITROSALICYLALDEHYDES AND THEIR PREPARATION
Lloyd D. Taylor, Everett, Mass., assignor to Polaroid Corporation, Cambridge, Mass., a corporation of Delaware
No Drawing. Continuation-in-part of application Ser. No. 302,010, Aug. 14, 1963. This application Aug. 20, 1965, Ser. No. 481,425
Int. Cl. C07c 47/56
U.S. Cl. 260—600                    9 Claims

ABSTRACT OF THE DISCLOSURE 5-nitrosalicylaldehydes having a substituent in the 3-position which is characterized by its ability to form a chelate with metals are prepared. The compounds are useful in the synthesis of photospirans.

---

This application is a continuation-in-part of U.S. patent application Ser. No. 302,010, filed Aug. 14, 1963, now abandoned and replaced by U.S. patent application Ser. No. 533,406, filed Mar. 11, 1966, now U.S. Patent 3,299,079.

This invention relates to novel chemical compounds and syntheses for the same.

One object os to provide, as novel chemical compounds, 3-substituted nitrosalicylaldehyde asnd the Schiff bases thereof.

Still another object is to provide a novel procedure for preparing 3-substituted nitrosalicylaldehydes and the Schiff bases thereof.

Other objects of the invention will in part be obvious and will in part appear hereinafter.

The invention accordingly comprises the process involving the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description.

The novel compounds of this invention are 5-nitrosalicyladehydes having a substituent in the 3-position which is characterized by its ability to form a chelate with a metal ion such as copper, cobalt, nickel, and chromium. The novel 5-nitrosalicylaldehydes within the scope of this invention may be represented by the formula:

(A)

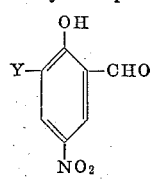

wherein Y is a —CH=O, —N=N—R, —CH$_2$—O—R$^1$, or

—CH$_2$—N—R$^3$
   |
   R$^2$ radical wherein R is an aryl radical such as phenyl; R$^1$ is hydrogen or an alkyl radical, and preferably a lower alkyl radical such as methyl and ethyl, or an aryl radical such a phenyl; and each of R$^2$ and R$^3$ is an alkyl radical, and preferably a lower alkyl radical such as methyl and ethyl, or an aryl radical such as phenyl; and R$^2$ and R$^3$ taken together may be a divalent aliphatic radical which, together with the N atom bonded thereto, may form, for example, a piperidine ring.

The compounds within Formula A wherein Y is a —CH=O, —CH$_2$—O—R$^1$, or

—CH$_2$—N—R$^3$
   |
   R$^2$ radical may be prepared directly from 3-chloromethyl-5-nitrosalicylaldehyde as described below.

When Y is —CH=O, the compound of Formula A may be prepared by oxidizing 3-chloromethyl-5-nitrosalicylaldehyde with dimethylsulfoxide.

When Y is —CH$_2$—O—R$^1$, and R$^1$ is hydrogen, the compound of Formula A may be prepared by reactng 3-chloromethyl-5-nitrosalicylaldehyde with acetone and water. When R$^1$ is alkyl or aryl, the compounds may be prepared by reacting 3-chloromethyl-5-nitrosalicylaldehyde with an alcohol of the formula R$^1$—OH. As examples of alcohols suitable for this purpose, mention may be made of the following:

CH$_3$OH
CH$_3$CH$_2$OH
(CH$_3$)$_2$CHOH
CH$_3$CH$_2$CH$_2$CH$_2$OH

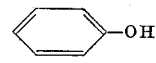

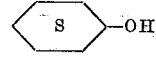

When Y is

—CH—N—R$^3$
   |
   R$_2$ the compound of Formula A may be prepared by reacting 3-chloro-methyl-5-nitrosalicylaldehyde with a secondary amine of the formula.

H—N—R$^3$
   |
   R$^2$ wherein R$^2$ and R$^3$ have the same meaning as above. Secondary amines of this type which are useful in the present invention may be of any size and are limited only by the effect they may have on the finished spiran as a result of steric hindrance. As examples of suitable secondary amines, mention may be made of the following:

NH(CH$_3$)$_2$
NH(CH$_3$CH$_2$)$_2$
NH[(CH$_3$)$_2$CH]$_2$

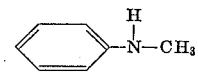

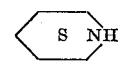

When Y is —N=N—R, the compound of Formula A may be prepared by coupling a suitable diazonium salt into 5-nitrosalicylaldehyde.

As examples of the novel compounds of this invention, mention may be made of:

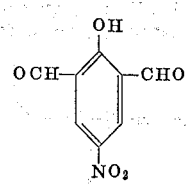

3,507,921

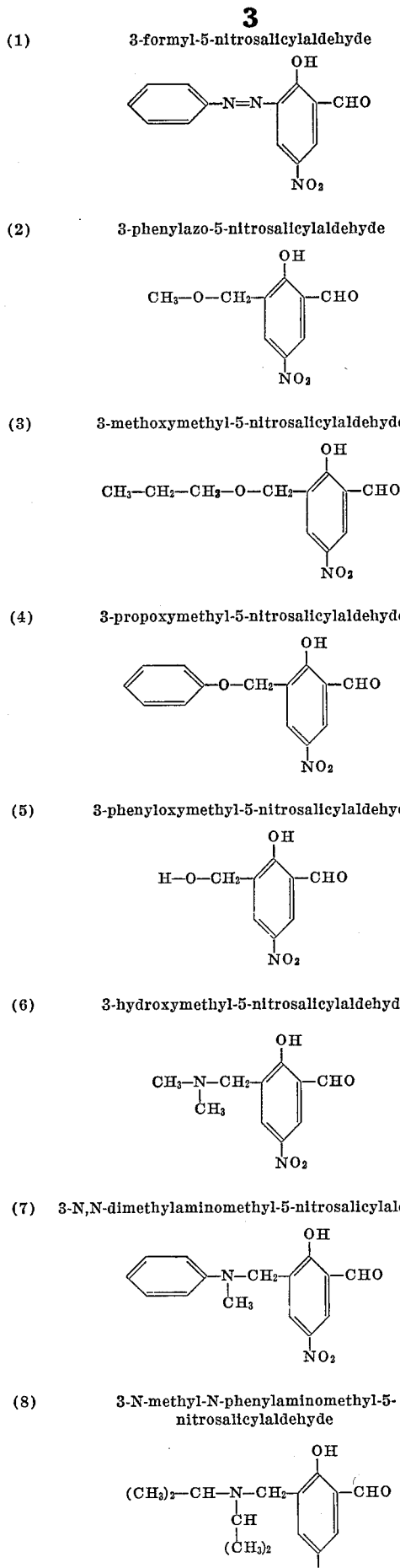

(1) 3-formyl-5-nitrosalicylaldehyde
(2) 3-phenylazo-5-nitrosalicylaldehyde
(3) 3-methoxymethyl-5-nitrosalicylaldehyde
(4) 3-propoxymethyl-5-nitrosalicylaldehyde
(5) 3-phenyloxymethyl-5-nitrosalicylaldehyde
(6) 3-hydroxymethyl-5-nitrosalicylaldehyde
(7) 3-N,N-dimethylaminomethyl-5-nitrosalicylaldehyde
(8) 3-N-methyl-N-phenylaminomethyl-5-nitrosalicylaldehyde (9) 3-N,N-diisopropylaminomethyl-5-nitrosalicyl-aldehyde

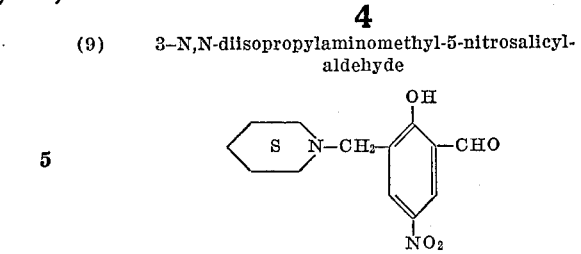

(10) 3,N-piperidinomethyl-5-nitrosalicylaldehyde

The novel compounds of this invention may, if desired, be converted to the corresponding Schiff bases by condensation with a primary amine of the formula $R^4$—$NH_2$ wherein $R^4$ is an alkyl radical, preferably a lower alkyl radical such as methyl and ethyl, or an aryl radical, such as phenyl. Thus, for example, the compound of Formula 1 can be reacted with two moles of a primary amine to provide a compound of the formula (B)

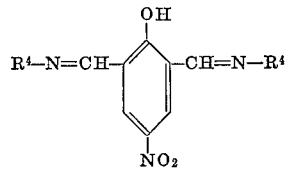

wherein $R^4$ has the same meaning as above. As examples of suitable amines, mention may be made of the following:

$$CH_3NH_2 \quad CH_3CH_2NH_2 \quad (CH_3)_2CHNH_2$$

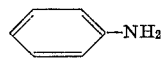

It will be noted that the radical —CH=N—$R^4$ has the same meaning as above provides a chelating function on the compounds of Formula B analogous to that provided by the radical Y— on the compounds of Formula A.

The novel compounds of this invention and the Schiff bases thereof are particularly useful as intermediates in the production of chelatable photospirans, as disclosed in the parent application cited above. Photospirans of this type may be represented by the formula:

(C)

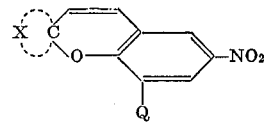

wherein X is the residue of a methylene base and Q is —CH=O, —N=N—R, —CH$_2$—O—$R^1$, $$-CH-N-R^3$$
$$\quad\;\; |$$
$$\quad\;\; R_2$$

or —CH=N—$R^4$, wherein R, $R^1$, $R^2$, $R^3$ and $R^4$ have the same meanings as above, said Q radical providing the chelating function when Compound C is in its open form. The term "residue of a methylene base" is intended to refer to the methylene base portion of the compound after condensation of said methylene base with a compound of Formula A or B to form the photospiran, as described in said parent application.

The radicals represented by R, $R^1$, $R^2$, $R^3$ and $R^4$, described above, may contain water-solubilizing groups, thereby imparting water-solubility to the photospiran ultimately formed. It should be understood that the size or composition of these radicals is not critical with respect to novel compounds of this invention; however, it should be understood that these radicals should not have the effect of rendering the ultimately formed photospirans non-phototropic or non-thermochromic by, for example, steric hindrance.

The novel substituted salicylaldehydes within this invention are preferably prepared from 3-chloromethyl-5-nitrosalicylaldehyde, as described above.

3-chloromethyl-5-nitrosalicylaldehyde may be prepared by reacting 5-nitrosalicylaldehyde with chloromethyl methyl ether and aluminum chloride. 3-chloromethyl-5-nitrosalicylaldehyde and the preparation thereof is disclosed and claimed in the copending application of Lloyd D. Taylor and Robert Davis, Ser. No. 220,035, filed Aug. 28, 1962.

The following nonlimiting example illustrates the preparation of the 3 - chloromethyl - 5-nitrosalicylaldehyde starting material:

EXAMPLE 1

A 2-liter, 3-necked round bottom flask was fitted with a mechanical stirrer, addition tube and an Allihn condenser surmounted with a Friedrichs' condenser fitted with a calcium chloride drying tube. Into the flask was placed 95 g. (0.57 mole) of 5-nitrosalicylaldehyde and 1 liter of chloromethyl methyl ether. The solution was cooled to about 5° C. 332 g. of aluminum chloride were added with stirring over a one-hour period. The thus-formed slurry was slowly brought to room temperature and then to reflux. Reflux was continued until the evolution of hydrogen chloride ceased. The remaining viscous solution was cooled to room temperature and poured with stirring into 3 liters of crushed ice. The resulting brown tar was stirred with ice water for approximately 30 minutes. The product, a brown solid, was then filtered and washed with water. The filtrate was twice extracted with ether. The ether extract was dried with sodium sulfate and the ether removed by evaporation. The resulting brown solid was added to the product. The product was further purified by recrystallization from carbon tetrachloride and hexane. 108 g. of 3-chloromethyl-5-nitrosalicylaldehyde was obtained melting at 90.5–91.5° C. and showing the following.

*Analysis.*—Calculated for $C_8H_6ClNO_4$ (percent): C, 44.58; H, 2.81; N, 6.50; Cl, 16.45. Found (percent): C, 44.4; H, 2.8; N, 6.6; Cl, 16.7.

The following nonlimiting examples illustrate the preparation of the novel compounds within the scope of this invention:

EXAMPLE 2

In a 500 ml. beaker, 25 g. of 3-chloromethyl-5-nitrosalicylaldehyde prepared as in Example 1 was dissolved in 200 cc. of dry ethanol. Water was added to a cloud point at approximately 80° C. The solution was allowed to cool and white needles were formed. The resulting compound:

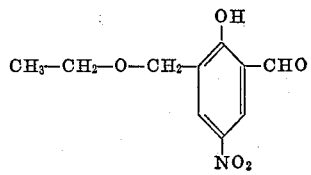

3-ethoxymethyl-5-nitrosalicylaldehyde, melted at 80° C. and showed the following:

*Analysis.*—Calculated for $C_{10}H_{11}O_5$ (percent): C, 53.2; H, 4.9; N, 6.2. Found (percent): C, 53.0; H, 5.0; N, 6.3.

EXAMPLE 3

To a solution of 21.5 g. (0.1 mole) of a 3-chloromethyl-5-nitrosalicylaldehyde in 2 liters of dry benzene was added 17.0 g. (0.2 mole) of piperidine. The resulting precipitate was removed by filtering and dissolved in 1 liter of water and sufficient hydrochloric acid to dissolve the precipitate. The solution was neutralized with sodium hydroxide. The product, 3,N-piperidinomethyl-5-nitrosalicylaldehyde, was filtered and dried, decomposed at about 235° C. and showed the following:

*Analysis.*—Calculated for $C_{13}H_{16}N_2O_4$ (percent): C, 59.1; N, 6.1; H, 10.6. Found (percent): C, 58.9; N, 6.1; H, 10.7.

EXAMPLE 4

To a boiling solution of 730 g. (0.34 mole) of 3-chloromethyl-5-nitrosalicylaldehyde in 50 ml. of acetone, 50 ml. of distilled water was added. The solution was then heated for 15 minutes. Upon cooling, white needles separated out which were removed by filtration and dried. The product

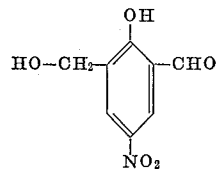

3-hydroxymethyl-5-nitrosalicylaldehyde melted at 135–136° C. and showed the following:

*Analysis.*—Calculated for $C_8H_7NO_5$ (percent): C, 48.7; H, 3.55; N, 7.1. Found (percent): C, 48.9; H, 3.7; N, 7.0

The following nonlimiting examples illustrate the use of the novel compounds within the scope of this invention in the synthesis of photospirans and the phototropic chelation thereof.

EXAMPLE 5

A solution containing 400 cc. of absolute ethanol, 5.19 (0.03 mole) of 2-methylene-1,3,3-trimethylindoline and 7.92 g. (0.03 mole) of 3,N-piperidinomethyl-5-nitrosalicylaldehyde prepared as in Example 3 was refluxed for 16 hours. The solution was filtered and the filtrate allowed to crystallize. The product was filtered and redissolved in 500 cc. of absolute ethanol and recrystallized. The resulting photospiran

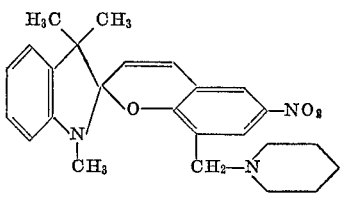

melted at 148° C. and showed the following:

*Analysis.*—Calculated for $C_{25}H_{29}N_3O_3$ (percent): C, 71.6; N, 10.0; H, 6.9. Found (percent): C, 71.6; N, 10.1; H, 70

A 1 to 1 mole ration of the above photospiran and cobaltous chloride were dissolved in an ethanol/acetone solution. The resulting green solution was then divided into three portions: (1) The first portion was observed at room temperature and the green color slowly turned to brown. Upon pouring the solution into water, a magenta precipitate formed. (2) The second portion was exposed to ultraviolet light for two minutes. The solution turned brown in color and formed a magenta precipitate in water. (3) The third portion was subjected to heat and reacted in the same manner as the solution exposed to ultraviolet light. A control sample showed the photospiran to be colorless in water. The intensity of the color and speed with which it forms in the room temperature experiment indicate a slower rate of activation at room temperature than with ultraviolet light or heat.

Results similar to the foregoing were also obtained with the above photospiran using nickel chloride as the chelating agent, and using ethanol and acetone solutions as well as ethanol/acetone.

EXAMPLE 6

Into a 100 ml. round bottom flask, fitted with a reflux condenser and a calcium chloride drying tube were placed 1.0 g. of 3-hydroxymethyl-5-nitrosalicylaldehyde prepared as in Example 4 and 50 ml. of absolute ethanol. One equivalent of 2-methylene-1,3,3-trimethylindoline was added to the flask and the solution was refluxed overnight. The ethanol was then evaporated and 50 ml. of dry hexane were added. A purple solid precipitated. The product was recrystallized three times from acetone and water. The resulting photospiran

[Structure: indoline-spiro-chromene with H3C, CH3, N-CH3, O, NO2, CH2-OH substituents]

melted at 187–188° C. and showed the following:

*Analysis.*—Calculated for $C_{20}H_{20}N_2O_4$ (percent): C, 68.2; H, 5.68; N, 7.95. Found (percent): C, 68.2; H, 5.7; N, 7.9.

A 1 to 1 mole ratio of the above photospiran and cobaltous chloride were dissolved in a 1 to 1 ethanol/acetone solution, forming a deep blue color. The solution was then divided into 3 portions and handled in the following manner: (1) The first portion of the solution, after standing at room temperature for a few minutes, was poured into an excess of water where the photospiran precipitated in its non-colored closed form. (2) The second portion of the solution was exposed to a source of ultraviolet radiation for two minutes whereupon it turned green in color. The green solution was poured into an excess of water forming a precipitate red-purple in color indicating the chelation of the photospiran in its open form. (3) The third portion of the solution was exposed to heat at 80° C. for two minutes and produced the same effects as noted in (2) above. Two controls were also observed in conjunction with the foregoing chelation experiment. The first comprised a solution of the above-noted photospiran in the ethanol/acetone solution which turns red upon exposure to ultraviolet light and colorless when precipitated in water. The second control comprised an ethanol/water solution of cobaltous chloride which is blue in color and which diminishes in intensity of blue color when poured into the water solution.

EXAMPLE 7

Into a 50 ml. flask were placed 25 cc. of absolute alcohol, 2.25 g. (0.01 mole) of 3-ethoxymethyl-5-nitrosalicylaldehyde prepared as in Example 2 and 1.73 g. (0.01 mole) of 2-methylene-1,3,3-trimethylindoline. The solution was refluxed for 3 hours and then cooled. The resulting photospiran

[Structure: indoline-spiro-chromene with H3C, CH3, N-CH3, O, NO2, CH2-O-CH2-CH3 substituents]

melted at 112.5° C. and showed the following:

*Analysis.*—Calculated for $C_{22}H_{24}N_2O_4$ (percent): C, 69.5; H, 6.3; N, 7.4. Found (percent): C, 69.3; H, 6.3; N, 7.4.

Results similar to those reported for Example 6 were obtained when the above photospiran was treated as in Example 6, using both nickel and cobaltous chloride as the chelating agents, and ethanol, acetone, and ethanol/acetone solutions.

Chelatable photospirans as described above may be used in heat- and light-actuated document copy processes and in sensitized record materials.

Since certain changes may be made in the above products and processes without departing from the scope of the invention herein involved, it is intended that all matter contained in the above description shall be interpreted as illustrative and not in a limiting sense.

What is claimed is:

1. Compounds selected from the group represented by the formula

[Structure: benzene ring with OH, Y, CHO, NO2 substituents]

wherein Y is selected from the group consisting of —CH=O, —N=N—R, —CH$_2$—O—R$^1$, and $$-CH_2-N(R^2)-R^3$$

wherein R is aryl, R$^1$ is selected from the group consisting of hydrogen, alkyl, and aryl, and each of R$^2$ and R$^3$ is selected from the group consisting of alkyl and aryl and R$^2$ and R$^3$ taken together may be a divalent aliphatic radical.

2. 3-ethoxymethyl-5-nitrosalicylaldehyde.
3. 3,N-piperidinomethyl-5-nitrosalicylaldehyde.
4. 3-hydroxymethyl-5-nitrosalicylaldehyde.
5. The process for preparing compounds of the formula

[Structure: benzene ring with OH, R$^1$—O—CH$_2$—, CHO, NO2 substituents]

wherein R$^1$ is selected from the group consisting of alkyl and aryl which comprises reacting 3-chloromethyl-5-nitrosalicylaldehyde with an alcohol of the formula R$^1$—OH wherein R$^1$ has the same meaning as above.

6. The process for preparing 3-ethoxymethyl-5-nitrosalicylaldehyde which comprises reacting ethanol with 3-chloromethyl-5-nitrosalicylaldehyde.

7. The process for preparing compounds of the formula

[Structure: benzene ring with OH, R$^3$—N(R$^2$)—CH$_2$—, CHO, NO2 substituents]

wherein each of R$^2$ and R$^3$ is selected from the group consisting of alkyl and aryl and R$^2$ and R$^3$ taken together may be a divalent aliphatic radical which comprises reacting 3-chloromethyl-5-nitrosalicylaldehyde with a secondary amine of the formula $$H-N(R^2)-R^3$$

wherein R$^2$ and R$^3$ have the same meanings as above.

8. The process for preparing 3-N-piperidino-5-nitrosalicylaldehyde which comprises reacting piperidine with 3-chloromethyl-5-nitrosalicylaldehyde.

9. The process for preparing 3-hydroxymethyl-5-nitrosalicylaldehyde which comprises reacting acetone and water with 3-chloromethyl-5-nitrosalicylaldehyde.

No references cited.

LEON ZITVER, Primary Examiner

R. H. LILES, Assistant Examiner

U.S. Cl. X.R.

260—192, 206, 294.7, 570.9, 571